(12) United States Patent
Yoshida

(10) Patent No.: US 7,378,630 B2
(45) Date of Patent: May 27, 2008

(54) LIGHT EMITTING UNIT AND IMAGING APPARATUS

(75) Inventor: Hideo Yoshida, Saitama (JP)

(73) Assignee: Fujinon Corporation, Saitama-Shi (JP)

( * ) Notice: Subject to any disclaimer, the term of this patent is extended or adjusted under 35 U.S.C. 154(b) by 124 days.

(21) Appl. No.: 11/046,678

(22) Filed: Feb. 1, 2005

(65) Prior Publication Data

US 2005/0174475 A1 Aug. 11, 2005

(30) Foreign Application Priority Data

Feb. 2, 2004 (JP) ............................. 2004-025746

(51) Int. Cl.
 *G01J 1/32* (2006.01)
 *H05B 37/02* (2006.01)
 *H05B 39/04* (2006.01)
(52) U.S. Cl. ..................... 250/205; 315/313; 315/153
(58) Field of Classification Search ............... 250/205, 250/552, 553; 345/35, 39, 40, 48, 90, 95, 345/98, 42, 80; 348/70, 71; 315/306, 313, 315/312, 153, 154, 122, 186 R, 186, 188, 315/193, 196, 90
See application file for complete search history.

(56) References Cited

U.S. PATENT DOCUMENTS 3,796,951 A * 3/1974 Joseph ...................... 324/122
4,017,796 A * 4/1977 Tobias ....................... 324/122
6,320,322 B1 * 11/2001 Tanaka .................... 315/169.3
7,085,489 B2 * 8/2006 Yamashita .................. 396/157

FOREIGN PATENT DOCUMENTS

JP       08106577 A  *  4/1996
JP     2003-307771 A    10/2003

* cited by examiner

*Primary Examiner*—Thanh X. Luu
*Assistant Examiner*—Brian J Livedalen
(74) *Attorney, Agent, or Firm*—Birch, Stewart, Kolasch & Birch, LLP

(57) ABSTRACT

A light emitting unit which radiates auxiliary light to a subject to be imaged, said light emitting unit comprising:
 a plurality of light emitting elements disposed so as to have radiation areas different from each other, said light emitting elements being electrically connected in series; and
 a changing device which changes the number of light emitting elements in a light emitting state in said light emitting elements.

6 Claims, 7 Drawing Sheets

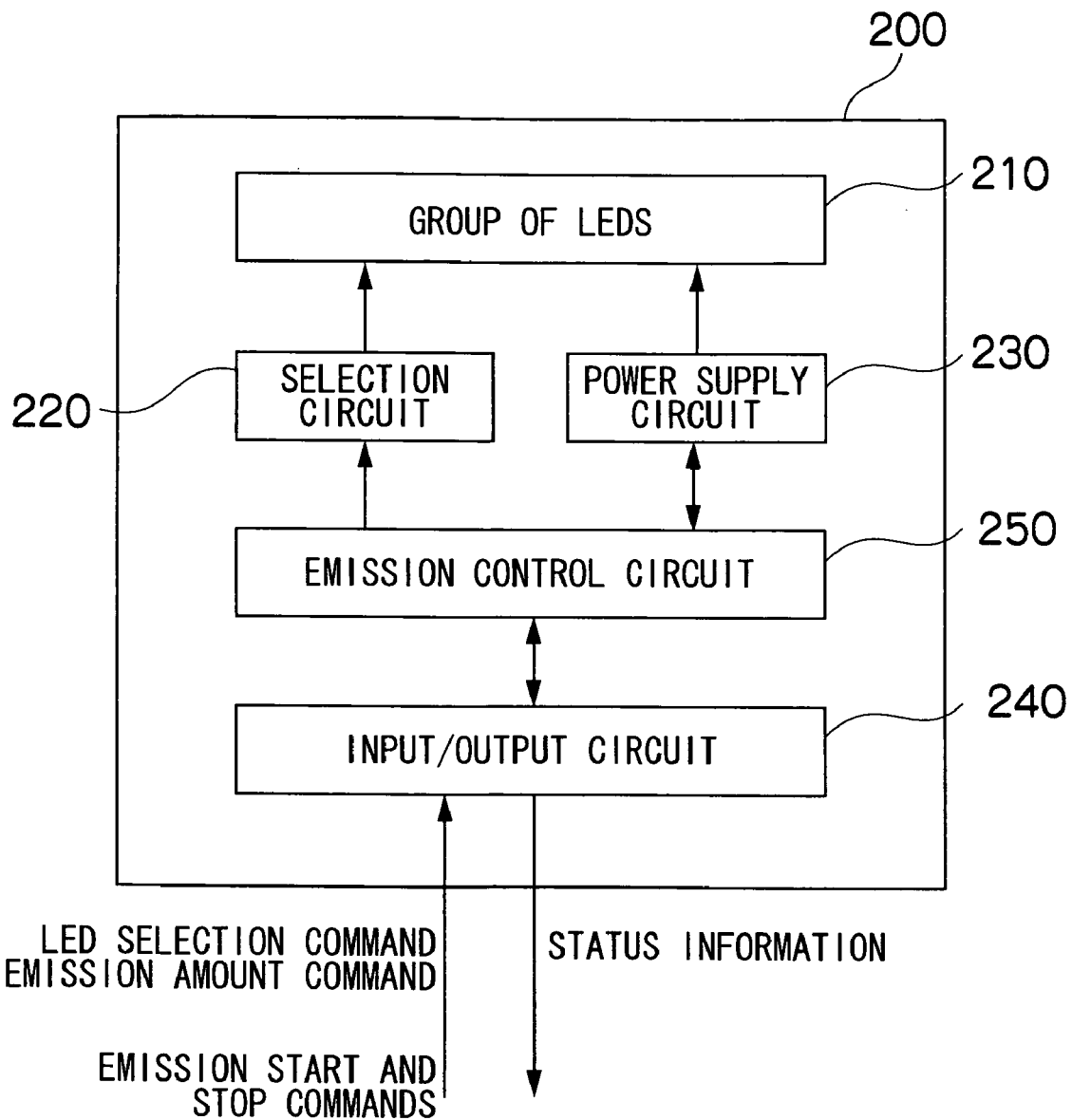

(1) ON

| 11 | 12 | 13 |
|----|----|----|
| 21 | 22 | 23 |
| 31 | 32 | 33 |

(2) ON

|    | 12 |    |
|----|----|----|
| 21 | 22 | 23 |
|    | 32 |    |

(3) ON

| 21 | 22 | 23 |

(4) ON

| 22 |

FIG.5A
FIG.5B
FIG.5C
FIG.5D
FIG.5E
FIG.5F
FIG.5G

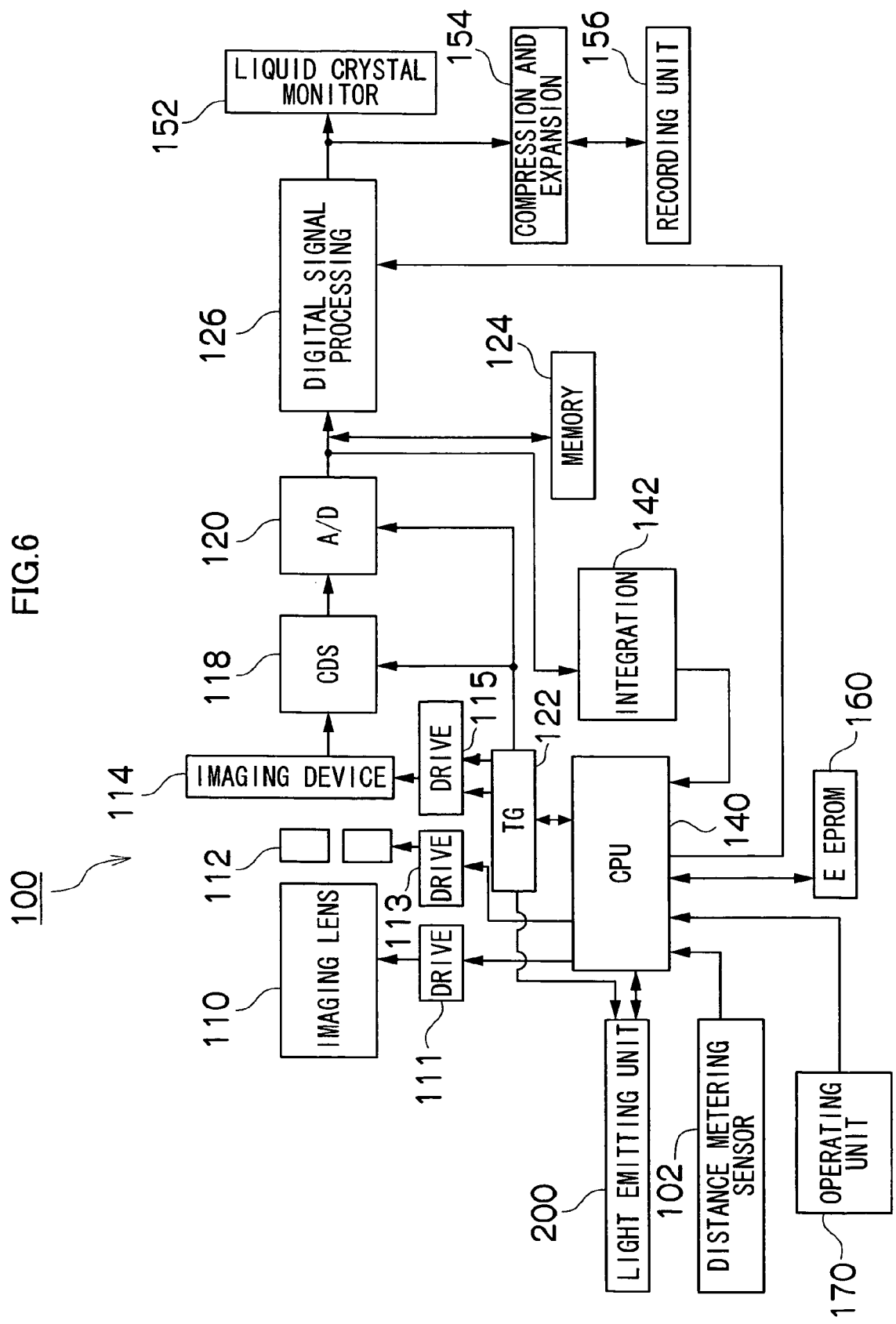

LIGHT EMITTING UNIT AND IMAGING APPARATUS

BACKGROUND OF THE INVENTION

1. Field of the Invention

The present invention relates to a light emitting unit and an imaging apparatus and, more particularly, to a light emitting unit having a plurality of light emitting elements and an imaging apparatus provided with the light emitting unit.

2. Description of the Related Art

Light emitting units having a flash element capable of emitting flashing light by discharge caused by ionizing xenon gas in a discharge tube at a dc voltage obtained by charging a capacitor (electronic flash, referred to simply as "flash") are known as a light emitting unit for radiating auxiliary light to a subject to be imaged.

Mobile phones with cameras have become widespread. Such mobile phones have a single white light emitting diode (hereinafter referred to as "white LED") which is a space-saving device for illuminating a subject to enable the subject to be imaged. For example, in the case of imaging under room illumination lower in luminance than daylight, a first button operation is performed to make the white LED to emit light for preliminary illumination on a subject and a second button operation is thereafter performed to image the subject.

In Japanese Patent Application Laid Open No. 2003-307771, a device is described which emits auxiliary light at a high power for a short time at the time of imaging of a still image and emits auxiliary light at a low power for a long time at the time of imaging of a moving image. In Japanese Patent Application Laid Open No. 2003-307771, description is also made with reference to FIG. 5 of the construction of a light emitting element in which a set of a red LED, a green LED and a blue LED forms a single unit capable of emitting white light and the method of separately adjusting the currents flowing through the LEDs electrically connected in parallel with each other to provide certain differences between the quantities of light emitted from the LEDs per unit time.

SUMMARY OF THE INVENTION

In the case of designing an imaging apparatus reduced in size and weight, a white LED is used more advantageously than a flash. However, there is a problem that a sufficiently high luminance cannot be obtained by a single white LED under illumination not sufficiently luminous. To solve this problem relating to luminance, a plurality of white LEDs having different radiation areas may be disposed and caused to emit light simultaneously with each other. However, if a plurality of white LEDs are simultaneously caused to emit light, a problem arises that the power consumption is increased in correspondence with the number of LEDs emitting light. Mobile phones used for phone conversation and data communication as well as imaging, in particular, become unable to operate for telephone conversation or data communication if the battery voltage is reduced as a result of use of battery energy for illumination. This is undesirable in terms of practical use, even though bright illumination light can be obtained.

That is, if a plurality of white LEDs having different radiation areas are caused to emit light simultaneously with each other as auxiliary light for reliable illumination on a subject, the electric power is excessively consumed. If precedence is given to energy saving, irradiation of the subject with auxiliary light cannot be performed with reliability. There has been such a trade-off problem.

In a case where only one white LED is provided, current control on the one white LED may suffice. On the other hand, in a case where a plurality of white LEDs having different radiation areas are provided, luminance nonuniformity occurs in an image obtained by imaging if the quantities of light emitted to the different radiation areas are not uniform, and there is, therefore, a need for complicated current control.

Japanese Patent Application Laid Open No. 2003-307771, no description is made as to how current control is performed on the plurality of white LEDs disposed so as to have different radiation areas.

In view of the above-described circumstances, an object of the present invention is to provide a light emitting unit capable of efficiently irradiating a subject with auxiliary light while saving energy without reducing the quality of an image obtained by imaging of the subject when a plurality of light emitting elements having different radiation areas simultaneously emit light as the auxiliary light, and an imaging apparatus using the light emitting unit.

To achieve the above-described object, according to first aspect of the present invention, there is provided a light emitting unit which radiates auxiliary light to a subject to be imaged, the light emitting unit having a plurality of light emitting elements disposed so as to have radiation areas different from each other, the light emitting elements being electrically connected in series, and a changing device which changes the number of light emitting elements in a light emitting state in the light emitting elements.

According to a second aspect of the present invention, the light emitting unit in the first aspect further has a power supply device which outputs a constant voltage; the changing device includes a plurality of switching circuits provided in parallel with each other, the constant voltage being applied to one end of each of the plurality of switching circuits from the power supply device, the other end of each of the plurality of switching circuits being connected the light emitting element at a predetermined position in the plurality of light emitting elements connected in series; and the plurality of switching circuits respectively have voltage dividing resistors for constantly maintaining the current flowing through the light emitting elements regardless of the number of the light emitting elements in the light emitting state, the voltage dividing resistors differing in resistance value from each other.

According to a third aspect of the present invention, the light emitting unit in the first aspect further has a power supply device which outputs a plurality of constant voltages differing in voltage value from each other; the changing device includes a plurality of switching circuits provided in parallel with each other, the constant voltages being applied to ends of the plurality of switching circuits from the power supply device, the other end of each of the plurality of switching circuits being connected the light emitting element at a predetermined position in the plurality of light emitting elements connected in series; and the power supply device applies to the switching circuits the constant voltages having different voltage values for constantly maintaining the current flowing through the light emitting elements regardless of the number of the light emitting elements in the light emitting state.

According to a fourth aspect of the present invention, a light emitting diode is used as each of the light emitting elements.

According to a fifth aspect of the present invention, there is provided an imaging apparatus having the light emitting unit in any one of the first to fourth aspects, a designation device which designates in the changing device of the light emitting unit the number of the light emitting elements in the light emitting state, and an imaging device which images the subject irradiated with auxiliary light from the light emitting elements.

The entire radiation area through which the auxiliary light is radiated can be easily changed while the amounts of emission from the plurality of light emitting elements are made uniform, thereby enabling the subject to be efficiently irradiated with light while achieving an energy saving effect without reducing the quality of the image obtained by imaging.

BRIEF DESCRIPTION OF THE DRAWINGS

FIG. 2 is a block diagram showing the internal configuration of a light emitting unit in the embodiment of the present invention;

FIGS. 5A through 5G are diagrams showing another example of selection among the LEDs;

FIG. 6 is a block diagram showing the internal configuration of the imaging apparatus in the embodiment of the present invention.

DETAILED DESCRIPTION OF THE PREFERRED EMBODIMENTS

The present invention will be described in detail with respect to the best mode of its implementation with reference to the accompanying drawings.

Figure 1:
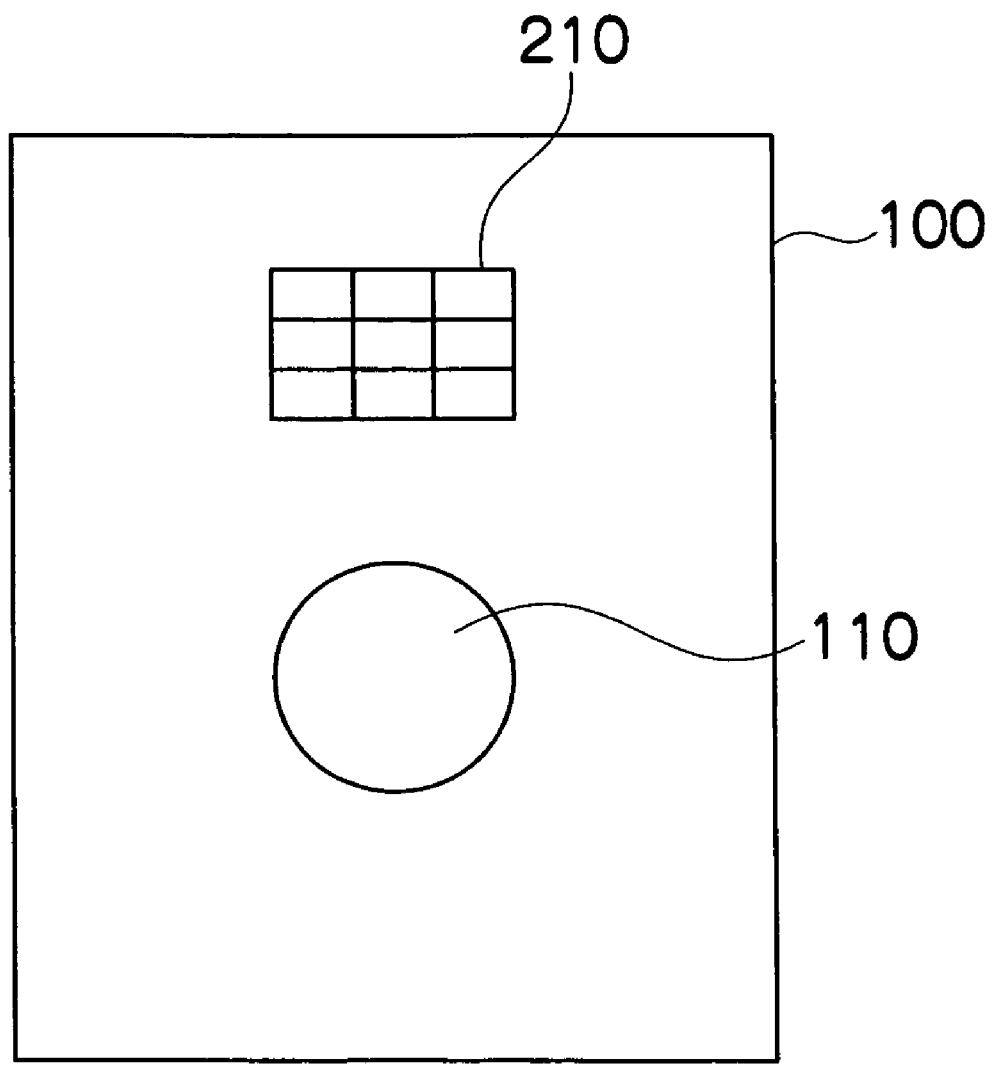
FIG. 1 is a diagram for explaining the positional relationship between an imaging lens in an imaging apparatus and a group of LEDs in an embodiment of the present invention.

FIG. 1 is a diagram for explaining the positional relationship between a group of light emitting diodes (LEDs) 210 and an imaging lens 110 in an imaging apparatus 100 in an embodiment of the present invention.

Referring to FIG. 1, the group of LEDs 210 and the imaging lens 110 are provided in a surface of the imaging apparatus 100 facing a subject at the time of imaging of the subject. The group of LEDs 210 radiates auxiliary light to a subject to be imaged. In this embodiment, the group of LEDs 210 is a two dimensional array of a plurality of white LEDs. These white LEDs respectively emit auxiliary light to radiation areas different from each other. The centers of the radiation areas of the white LEDs are different from each other. Light reflected by the subject when the subject is irradiated with external light such as daylight or room illumination light and the auxiliary light from the group of LEDs 210 enters the imaging lens 110.

A white LED is an LED capable of emitting white light. Various white LEDs exist. First, a white LED consisting of single white LEDs exists. Second, a white LED formed by combining a plurality of LEDs of different colors (e.g., three primary colors, red, green and blue) exists. The second type of LED comprises, for example, a combination of a red LED, a green LED and a blue LED all of which are lighted to emit white light. This white LED is also capable of emitting light of a color different from white according to the color temperature of external light by adjusting the amounts of emission from the red, green and blue LEDs relative to each other. In the following description, one unit LED or one unit set of LEDs for irradiating one radiation area is described as one white LED. That is, the above-mentioned second type of LED, i.e., one set of red, green and blue LEDs, is regarded as one white LED. Also, in some case in the following description, one white LED is referred to simply as "LED".

While in FIG. 1 an example of the group of LEDs formed of nine LEDs in a 3 rows×3 columns array is illustrated, the number of LEDs is not particularly specified in this embodiment. In some case in the following description, a description is made of a group of a certain number of LEDs other than nine for convenience sake.

FIG. 2 is a block diagram showing the internal configuration of a light emitting unit 200 having the group of LEDs 210.

Referring to FIG. 2, the light emitting unit 200 is constituted mainly by the group of LEDs 210, a selection circuit 220, a power supply circuit 230, an input/output circuit 240 and an emission control circuit 250.

The selection circuit 220 selects LEDs actually caused to emit light from among the plurality of LEDs forming the group of LEDs 210. The selection circuit 220 changes the auxiliary light radiation areas by changing the LEDs selected to emit light. The selection circuit 220 also selects between starting and stopping of emission of light from the LEDs.

The power supply circuit 230 supplies a selected one of the LEDs with electric power necessary for emission of light, the electric power being supplied at a predetermined voltage. In general, white LEDs have a forward voltage (e.g., 3.4 V) higher than a voltage supplied from a battery (e.g., 1.5 V) and it is difficult for such LEDs to be directly driven from a battery when the LEDs are connected in series as described below. Therefore, the power supply circuit 230 boosts an input voltage (a voltage from a battery) and supplies the boosted voltage as an output voltage to the group of LEDs 210. The power supply circuit 230 stabilizes the output voltage supplied to the group of LEDs 210 with respect to a voltage drop in the forward voltage across the selected LED or LEDs while reducing noise in the output voltage. The power supply circuit 230 has a control terminal for controlling the current flowing through the LEDs. The current flowing through the LEDs is changed from the emission control circuit 250 through the control terminal to change the amount of emission from the LEDs.

Various commands from a central processing unit (CPU) described below are input to the input/output circuit 240, and information on the state of the light emitting unit 200 is output to the CPU through the input/output circuit 240. Commands input to the light emitting unit 200 include an LED selection command, an emission amount command, an emission start command and an emission stop command. Input commands are supplied to the emission control circuit 250. As a preparation for light emission, input of a charge start command or output of charge condition information (indicating, for example, "charging" or "completion of charging") may be performed.

The emission control circuit 250 controls the selection circuit 220 and the power supply circuit 230 according to the contents of commands supplied via the input/output circuit 240. To change the auxiliary light radiation areas, one or more of the LEDs to be caused to emit light are selected by controlling the selection circuit 220. To change the amount of emission, the voltage supplied to the LEDs is changed by controlling the power supply circuit 230 through the control terminal of the power supply circuit 230. The amount of emission may be changed in such a manner that the resistance of a voltage dividing resistor is changed by the selection circuit 220 under control to change the divided voltage applied to the LEDs.

Timing of starting light emission and stopping light emission of the group of LEDs 210 is performed by the emission control circuit 250 controlling the selection circuit 220 according to the emission start command and the emission start command input to the input/output circuit 240.

Figures 3A, 3B, 3C, 3D, 3E:
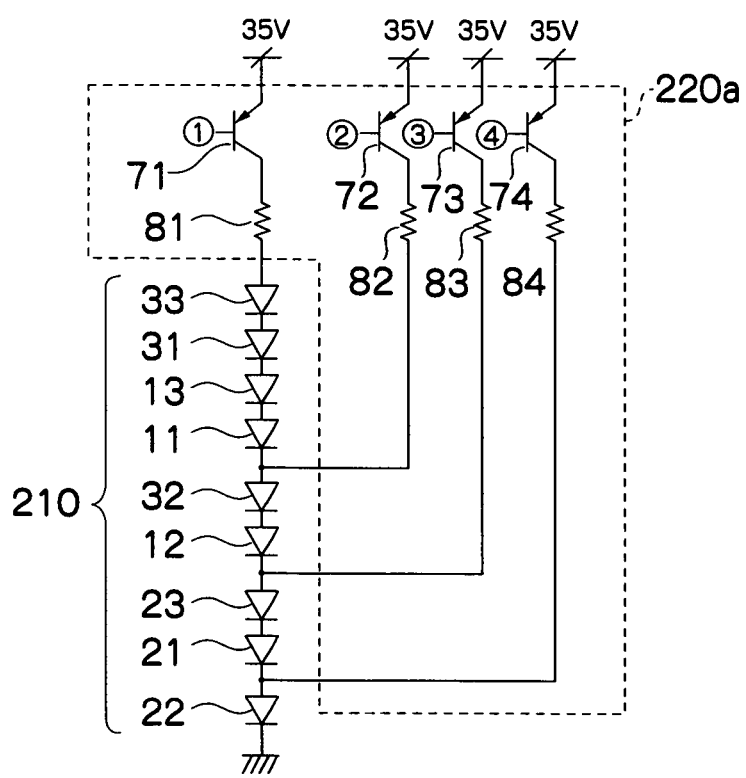
FIGS. 3A through 3E are diagrams showing an example of a selection circuit and an example of selection among the LEDs.

FIG. 3A is a diagram showing a group of LEDs 210 formed by electrically connecting in series nine LEDs 11, 12, 13, 21, 22, 23, 31, 32, and 33 in a 3 rows×3 columns array and a selection circuit 220a.

For convenience of description, the LEDs forming the group of LEDs 210 are respectively referred to as "first LED" 22, "second LED" 21, "third LED" 23, "fourth LED" 12, "fifth LED" 32, "sixth LED" 11, "seventh LED" 13, "eighth LED" 31 and "ninth LED" 33 in the order in which the LEDs are connected in series.

Referring to FIG. 3A, the selection circuit 220a is constituted of first to fourth switch elements 71, 72, 73, and 74 formed of transistors, and first to fourth voltage dividing resistors 81, 82, 83, and 84 differing in resistance value from each other. Emitter terminals of the switching elements 71 to 74 are respectively connected to the power supply circuit 230. Base terminals of the switching elements 71 to 74 are respectively connected to the emission control circuit 250. Through the base terminals, signals (on/off signals) for switching between on-state and off-state settings of the switching elements 71 to 74 are input to the switching elements 71 to 74 from the emission control circuit 250. The voltage dividing resistors 81 to 84 divide the voltage supplied from the power supply circuit 230 to apply a predetermined voltage to each of the selected LEDs. One end of the voltage dividing resistors 81 to 84 is connected to a collector terminal of the corresponding one of the switching elements 71 to 74, while the other end is connected to a predetermined point in the group of LEDs 210 connected in series.

The first switching element 71 changes the nine LEDs 11, 12, 13, 21, 22, 23, 31, 32, and 33 to the on state to cause these LEDs to emit light, as shown in FIG. 3B. The second switching element 72 changes the five LEDs 12, 21, 22, 23, and 32 to the on state to cause these LEDs to emit light, as shown in FIG. 3C. The third switching element 73 changes the three LEDs 21, 22, and 23 to the on state to cause these LEDs to emit light, as shown in FIG. 3D. The fourth switching element 74 changes only one LED 22 to cause this LED to emit light, as shown in FIG. 3E.

The first voltage dividing resistor 81 has its one end connected to the first switching element 71 and the other end connected to the ninth LED 33. The second voltage dividing resistor 82 has its one end connected to the second switching element 72 and the other end connected to a connection point between the fifth LED 32 and the sixth LED 11. The third voltage dividing resistor 83 has its one end connected to the third switching element 73 and the other end connected to a connection point between the third LED 23 and the fourth LED 12. The fourth voltage dividing resistor 84 has its one end connected to the fourth switching element 74 and the other end connected to a connection point between the first LED 22 and the second LED 21.

To constantly maintain the current flowing through the LEDs regardless of the number of LEDs in the light emitting state, the resistance values R(i) of the voltage dividing resistors 81 to 84 are selected so as to satisfy the following equation 1:

$$R(i)=(V_0-Vf \times n(i))/I \qquad \text{[Equation 1]}$$

where i is an index for each switching element and each voltage dividing resistor (i=1, 2, 3, 4); $V_0$ is the predetermined voltage supplied from the power supply circuit 230 (e.g., 35 V); Vf is the specified forward voltage of the LEDs (e.g., 3.4 V); n(i) is the number of LEDs in the light emitting state; and R(i) is the resistance value of each voltage dividing resistor; and I is the value of a constant current caused to flow through the LEDs (e.g., 15 mA).

The correspondence relationship between FIG. 2 and FIG. 3A will be briefly described. The selection circuit 220 shown in FIG. 2 is constituted by a plurality of switching circuits 220a provided in parallel with each other (respectively formed of the first switching element 71 and the first voltage dividing resistor 81, the second switching element 72 and the second voltage dividing resistor 82, the third switching element 73 and the third voltage dividing resistor 83, and the fourth switching element 74 and the fourth voltage dividing resistor 84), as shown in FIG. 3A. A constant voltage is applied to one end of each switching circuit from the power supply circuit 230, and the other end of each switching circuit is connected to the LED at a predetermined position in the group of LEDs 210 connected in series. The switching circuits have voltage dividing resistors 81 to 84 having different resistance values for constantly maintaining the current flowing through the LEDs regardless of the number of LEDs in the light emitting state.

Figure 4A:
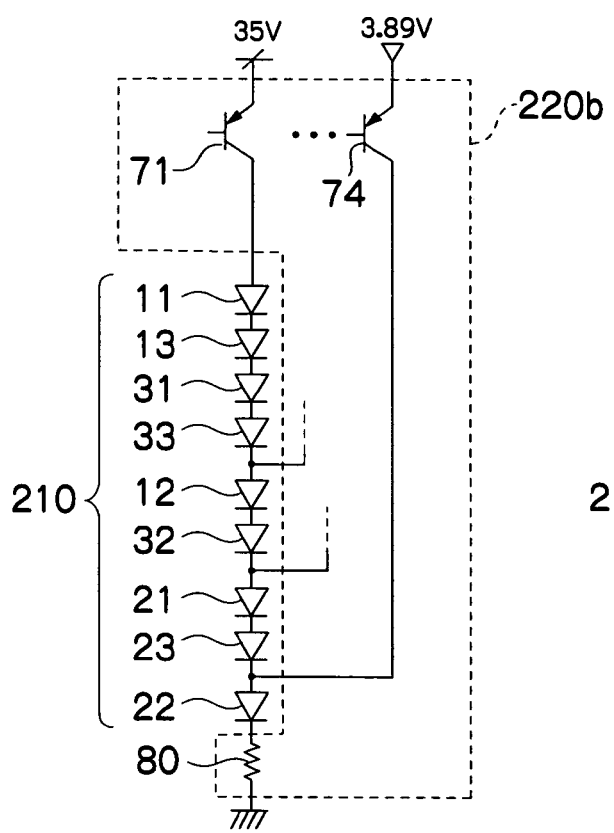
FIGS. 4A and 4B are diagrams showing other examples of the selection circuit.
Figure 4B:
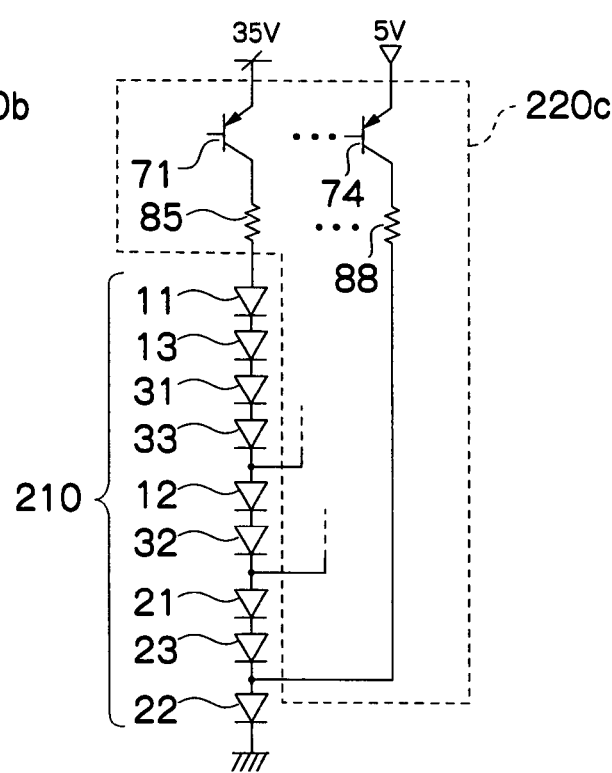

FIGS. 4A and 4B show selection circuits 220b and 220c, which are other examples of the selection circuit 220.

The selection circuit shown in FIG. 4A is constituted of the first to fourth switching elements 71 to 74 shown in FIG. 3A and a common voltage dividing resistor 80. In FIG. 4A, illustration of the second switching element 72 and the third switching element 73 is omitted. To constantly maintain the current flowing through the LEDs regardless of the number of LEDs in the light emitting state, the voltage V(i) supplied from the power supply circuit 230 is applied to the emitter terminals of the switching elements 71 to 74 so as to satisfy the following equation 2:

$$V(i)=Vf \times n(i)+R \times I \qquad \text{[Equation 2]}$$

where i is an index for each switching element and dividing resistor (i=1, 2, 3, 4); Vf is the specified forward voltage of the LEDs (e.g., 3.4 V); n(i) is the number of LEDs in the light emitting state; and R is the resistance value of the common voltage dividing resistor; and I is the value of a constant current caused to flow through the LEDs (e.g., 15 mA).

The correspondence relationship between FIG. 2 and FIG. 4A will be briefly described. The selection circuit 220 shown in FIG. 2 is constituted by a plurality of switching circuits 220b provided in parallel with each other (respectively formed of the first switching element 71, the second switching element 72, the third switching element 73 and the fourth switching element 74), as shown in FIG. 4A. Different voltages are respectively applied to ends of the switching circuits from the power supply circuit 230, and the other end of each switching circuit is connected to the LED at a predetermined position in the group of LEDs 210 connected in series. The power supply circuit 230 applies to the switching circuits different constant voltages for constantly maintaining the current flowing through the LEDs regardless of the number of LEDs in the light emitting state.

The selection circuit 220c shown in FIG. 4B is constituted of the first to fourth switching elements 71 to 74 shown in FIG. 3A and first to fourth voltage dividing resistors 85 to 88. Illustration of the second switching element 72, the third switching element 73, the second voltage dividing resistor and the third voltage dividing resistor is omitted. The voltage dividing resistors 85 to 88 have resistance values such that the current flowing through the LEDs is constantly maintained.

The correspondence relationship between FIG. 2 and FIG. 4B will be briefly described. The selection circuit 220 shown in FIG. 2 is constituted by a plurality of switching circuits 220c provided in parallel with each other (respectively formed of the first switching element 71 and the first voltage dividing resistor 85, the second switching element 72 and the second voltage dividing resistor 86, the third switching element 73 and the third voltage dividing resistor 87, and the fourth switching element 74 and the fourth voltage dividing resistor 88), as shown in FIG. 4B. Each switching circuit has its one end connected to the power supply circuit 230 and the other end connected to the LED at a predetermined position in the group of LEDs 210 connected in series. The switching circuits have voltage dividing resistors 85 to 88 having different resistance values for constantly maintaining the current flowing through the LEDs regardless of the number of LEDs in the light emitting state.

FIGS. 5A through 5F are diagrams for explaining examples of selections from LEDs in a case where the group of LEDs 210 is formed of thirty LEDs in a 6 rows×5 columns array. In the following description with reference to FIGS. 5A through 5F, the rows are referred to as "first row" to "sixth row" in the order from the top to the bottom, and the columns are referred to as "first column" to "fifth column" in the order from the left end.

Figures 5A, 5B, 5C, 5D, 5E, 5F, 5G:
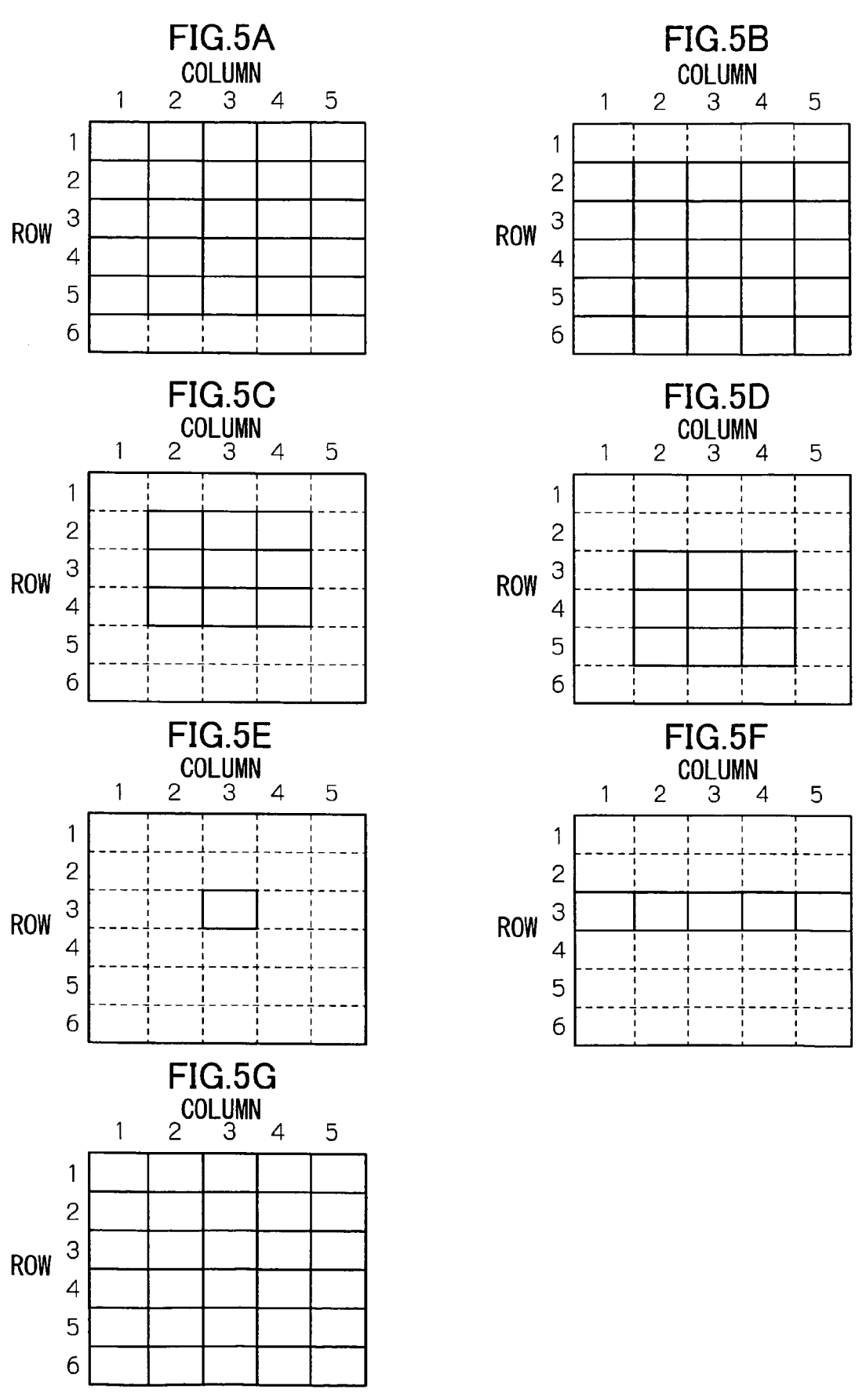

FIG. 5A shows a state in which the LEDs located both in the first to fifth rows (i.e., the upper five rows) and in all the columns are selected and lighted; FIG. 5B a state in which the LEDs located both in the second to sixth rows (i.e., the lower five rows) and in all the columns are selected and lighted; FIG. 5C a state in which the LEDs located both in the second to fourth rows and in the second to fourth columns are selected and lighted; FIG. 5D a state in which the LEDs located both in the third to fifth rows and in the second to fourth columns are selected and lighted; FIG. 5E a state in which only the LED located both in the third row and in the third column is selected and lighted; FIG. 5F a state in which the LEDs located both in the third row and in all the columns are selected and lighted; and FIG. 5G a state in which the LEDs located both in all the rows and in all the columns are selected and lighted. These selections of the LEDs are made by the emission control circuit 250 controlling the selection circuit 220 according to LED selection commands input to the above-described input/output circuit 240.

The forms of LED selection commands input to the input/output circuit 240 include a first form for designating one or more of the LEDs to be lighted on an LED-by-LED basis, and a second form for designating one or more of the LEDs by using identification information assigned to LED selection patterns (e.g., those respectively shown in FIGS. 5A through 5G). For example, in the first form, the selection of the LEDs in the second to fourth rows and in the second to fourth columns in the case shown in FIG. 5C is designated on an LED-by-LED basis. More specifically, for example, one bit is assigned to each LED and the selection is designated by using bit sequence data indicating "1" (emission) or "0" (non-emission) on a bit-by-bit basis. In the second form, the selection of the LEDs in the case shown in FIG. 5C is designated, for example, by means of an identification number assigned to the corresponding selection pattern (a pattern for emission from the LEDs in the second to fourth rows and in the second to fourth columns).

The plurality of LEDs to be caused to emit light are electrically connected in series. If electrical connections between the LEDs cannot be fixed in one form, the form of electrical connections between the LEDs is changed. For example, when pre-emission (e.g., pre-emission for automatic focusing) is performed in the state shown in FIG. 5F, the LEDs in the third row and in the first to fifth columns are electrically connected in series connection form and caused to emit light and, when main emission is performed in the state shown in FIG. 5D, the LEDs in the third row and in the second to fourth columns, the LEDs in the fourth row and in the second to fourth columns and the LEDs in the fifth row and in the second to fourth columns are electrically connected in series connection form and caused to emit light.

Thus, the light emitting unit 200 in this embodiment does not light all the LEDs at all times but causes, according to required timing, required ones of the LEDs to emit a required quantity of light for a required time period.

FIG. 6 is a block diagram showing an example of the internal configuration of the imaging apparatus 100 having the above-described light emitting unit 200.

Referring to FIG. 6, the imaging apparatus 100 is constituted mainly by the light emitting unit 200, a distance metering sensor 102, the imaging lens 110, an imaging lens drive circuit 111, a diaphragm 112, a diaphragm drive circuit 113, an imaging device 114, an imaging device drive circuit 115, a correlation-double-sampling circuit (CDS circuit) 118, an A/D converter 120, a timing generation circuit 122, a memory 124, a digital signal processing circuit 126, a CPU 140, an integration circuit 142, a liquid crystal monitor 152, a compression and expansion circuit 154, a recording unit 156, an electrically erasable programmable read-only memory (EEPROM) 160, and an operating unit 170.

A subject is irradiated with auxiliary light from the light emitting unit 200 if necessary as well as external light such as daylight or room illumination light, and these kinds of light are reflected by the subject. Reflected light from the subject travels through the imaging lens 110 and the diaphragm 112 to enter the imaging device 114, thereby forming an image of the subject on a light receiving surface of the imaging device 114.

In the light receiving surface of the imaging device 114, a multiplicity of photosensors are two-dimensionally arrayed. The photosensors convert the subject image formed on the light receiving surface into amounts of signal charge according to the quantities of light entering the photosensors, and accumulate the signal charges. The charges accumulated in the photosensors are output as an analog image signal according to a timing signal supplied from the timing generation circuit 122. The analog image signal output from the imaging device 114 is sampled and held on a pixel-by-pixel basis by the CDS circuit 118, converted from analog form into digital form by the A/D converter 120, temporarily stored in the memory 124 and thereafter input to the digital signal processing circuit 126. The imaging device drive circuit 115 for driving the imaging device, the CDS circuit 118 and the A/D converter 120 are synchronized with each other by means of the timing signal supplied from the timing generation circuit 122 to input a point-sequential image signal to the digital signal processing circuit 126.

The image signal input to the digital signal processing circuit 126 is converted from point-sequential form into simultaneous form, undergoes white balancing correction and gamma correction and is converted into an YC signal (formed of a brightness signal Y and color difference signals Cr and Cb).

The image signal output from the digital signal processing circuit 126 is input to the liquid crystal monitor 152 to display the image. The image signal is also compressed in a predetermined format by the compression and expansion circuit 154 and thereafter recording as image data on a predetermined recording medium such as a memory card by the recording unit 156. Further, in a reproduction mode, the image data recording on the memory card or the like is expanded by the compression and expansion circuit 154 and thereafter input to the liquid crystal monitor 152 to display the image.

The operating unit 170 includes a button (mode change button) for selection between modes such as an imaging mode and a reproduction mode, a button (zoom button) for inputting a zoom command, a button (shutter button) for inputting an imaging preparation command and an imaging start command, and other various buttons through which a user inputs commands.

The CPU 140 performs overall control on the sections of the imaging apparatus 100 on the basis of commands input through the operating unit 170 and performs various computations relating to automatic focusing (AF), automatic exposure (AE) and automatic white balancing (AWB).

In this embodiment, automatic focusing is performed in such a manner that the imaging lens 110 is moved to an in-focus position by means of the imaging lens drive unit 111 on the basis of the distance measured with the distance metering sensor 120 when the shutter button is half depressed (that is, when the imaging preparation command is input). In this embodiment, if the quantity of light coming from the subject and entering the imaging device is insufficient, the desired pre-emission for automatic focusing is performed by the light emitting unit 200.

Automatic focusing may alternatively be performed by a contrast AF method. In contrast AF, when the shutter button is half depressed, the CPU 140 moves the imaging lens to the in-focus position through the imaging lens drive unit 111 so that a G signal high frequency component is maximized.

Automatic exposure will be described. The CPU 140 obtains a subject luminance (EV value) on the basis of integrated values obtained by integrating the image signal in the integration circuit 142 with respect to red (R), green (G) and blue (B), and determines the aperture value and the shutter speed at the time of imaging on the basis of the EV value. The CPU 140 drives the diaphragm 112 on the basis of the determined aperture value through the diaphragm drive circuit 113 and controls the imaging device 114 exposure time on the basis of the determined shutter speed through the imaging device drive circuit 115 at the time of imaging. If the quantity of light coming from the subject and entering the imaging device is insufficient at the time of imaging, the CPU 140 makes the light emitting unit 200 emit auxiliary light for irradiation on the subject.

Automatic white balancing will be described. The CPU 140 detects the color temperature and corrects the color balance according to the color temperature. More specifically, the integration circuit 142 computes the integrated value with respect to each of a plurality of areas into which one frame is divided, the CPU 140 determines the color temperature on the basis of this integrated value and computes the while balance correction value with respect to each of R, G and B, and the digital signal processing circuit 126 makes a correction on the image signal with respect to each of R, G and B.

Also, the CPU 140 sends to the light emitting unit 200 an LED selection command to select one or more of the LEDs to be actually caused to emit light, an emission amount command designating the quantity of light to be emitted from each LED, an emission start command, an emission stop command and other commands.

A description will first be made of LED selection commands with respect to controls 1 to 5.

(Control 1)

In the case of zooming performed by changing the focal distance of the imaging lens 110 (so-called optical zoom), an imaging area on the subject and the radiation area corresponding to the imaging area are obtained on the basis of the focal distance of the imaging lens 110, the LEDs corresponding to the radiation area are determined, and an LED selection command indicating which LED should be caused to emit light is supplied to the light emitting unit 200.

Ordinarily, the focal distance of the imaging lens 110 is determined from the zoom position of the imaging lens 110 corresponding to a setting operation performed through the operating unit 170 by the user.

For example, in a state where "Wide" is set as a zoom position, the light emitting unit 200 is instructed to emit light from the LEDs in all the rows and in all the columns, as shown in FIG. 3B. In a state where "Tele" is set as a zoom position, the light emitting unit 200 is instructed to emit light from the LEDs in the first row and in the second column, the LEDs in the second row and in the first to third columns and the LEDs in the third row and in the second column, as shown in FIG. 3C).

(Control 2)

In the case of zooming performed by removing unnecessary portion from the original image obtained by imaging with the imaging device 114 to extract only the image portion in the necessary area (so-called trimming) (so-called electronic zoom), the radiation area corresponding to the trimming area (image extraction area) is obtained, the LEDs corresponding to the radiation area are determined, and an LED selection command indicating which LED should be caused to emit light is supplied to the light emitting unit 200.

For example, in a case where an operation for making the imaging apparatus perform electronic zooming is performed, an LED selection command is supplied to the light emitting unit 200 to change the emission mode from the emission from the LEDs in the first to third rows and in the first to third columns shown in FIG. 3B to the emission from only the LED in the second row and in the second column shown in FIG. 3E.

(Control 3)

One or more of the LEDs to be caused to emit light are determined on the basis of the subject distance such that a deviation between the imaging area and the radiation area caused by a change in the subject distance due to the difference between the positions of the imaging lens 110 and the LEDs is corrected, that is, the imaging area and the radiation area generally coincide with each other independently of the subject distance, and the corresponding LED selection command is supplied to the light emitting unit 200.

There are various concrete correction modes based on the subject distance. First, for example, a mode may be mentioned in which the subject distance is measured with the distance metering sensor 102 and one or more of the LEDs to be actually caused to emit light are determined on the basis of the measured subject distance. Second, a mode may be mentioned in which one or more of the LEDs to be actually caused to emit light are determined on the basis of whether or not a "macro mode" (short-distance imaging mode) is set by a user setting operation in the operating unit 170.

For example, in a case where the light emitting unit 200 has LEDs in a 6 rows×5 columns array as the group of LEDs 210, and where the light emitting unit 200 is instructed to emit light from the LEDs in the second to fourth rows and in the second to fourth columns shown in FIG. 5C when the "macro mode" is not selected, the light emitting unit 200 is instructed to emit light from the LEDs in the third to fifth rows and in the second to fourth columns shown in FIG. 5D when the "macro mode" is set.

(Control 4)

When pre-emission is performed before main emission for actual imaging of the subject, one or more of the LEDs to be actually caused to emit light are determined on the basis of the kind of pre-emission such that a restricted radiation area different from that at the time of main emission is formed, and the corresponding LED selection command is supplied to the light emitting unit 200.

There are various kinds of pre-emission. First, for example, pre-emission performed for automatic focusing may be mentioned. Second, pre-emission performed for red eye reduction may be mentioned. Third, pre-emission performed for determination of the amount of main emission at the time of imaging may be mentioned.

For example, the light emitting unit 200 is instructed to emit light from the LEDs in all the rows and in all the columns shown in FIG. 3B at the time of main emission, and the light emitting unit 200 is instructed to emit light from the LEDs in the second row and in all the columns shown in FIG. 3D at the time of pre-emission for automatic focusing and at the time of pre-emission for red eye reduction. In the case of pre-emission for automatic focusing, an LED selection command is supplied to the light emitting unit 200 such that the radiation area corresponds to the light receiving area of the distance metering sensor 102 used for automatic focusing. In the case of pre-emission for red eye reduction, an LED selection command is supplied to the light emitting unit 200 such that eyes of the subject and an area on the periphery of the eyes are defined as a radiation area. In actuality, the areas where irradiation with auxiliary light is required in such cases differ from each other. Therefore, different patterns of LEDs in the light emitting state are used for pre-emission for automatic focusing and pre-emission for red eye reduction, depending on the array of LEDs. For example, in a case where the light emitting unit 200 has LEDs in a 6 rows×5 columns array as the group of LEDs 210, the light emitting unit 200 is instructed to emit light from the LEDs in the upper five rows and in all the columns shown in FIG. 5A at the time of main emission, light from the LEDs in the third row and in all the columns shown in FIG. 5F at the time of pre-emission for automatic focusing, and light from the LEDs in the second to fourth rows and in the second to fourth columns shown in FIG. 5C at the time of pre-emission for red eye reduction.

(Control 5)

In a case where optical communication is performed between the imaging apparatus and an external device (not shown) capable of optical communication using the light emitting unit 200, an LED selection command is supplied to the light emitting unit 200 such that light is radiated in a restricted radiation area for optical communication different from that at the time of imaging. For example, the light emitting unit 200 is instructed to emit light from the LEDs in all the rows and in all the columns shown in FIG. 3B at the time of main emission, and light from only the LED in the second row and in the second column shown in FIG. 3E at time of optical communication.

A description will next be made of emission amount commands with respect to controls 6 and 7.

(Control 6)

The above-described LED selection instruction based on the focal distance of control 1 is performed; the amount of emission according to the focal distance of the imaging lens 110 or the f-number of the imaging lens 110 is determined; and the light emitting unit 200 is instructed to emit light to the determined amount of emission. The light emitting unit 200 is capable of simultaneously changing the LEDs in the light emitting state and the amount of emission.

More specifically, f-numbers and amounts of emission are registered in advance in the EEPROM 160 in a state of being related to each other; the f-number corresponding to the focal distance is obtained by referring to the EEPROM 160; the amount of emission related to the f-number is then obtained; and the light emitting unit is instructed to emit light to this amount of emission. The f-number ($F_{NO}$), the focal distance (f) of the lens and the effective aperture (D) of the lens are in the relationship expressed by $F_{NO}=f/D$. Therefore, for example, table information representing the correspondence relationship between the f-number and the amount of emission is stored in the EEPROM 160, and the f-number corresponding to the zoom position is obtained by referring to this table information to obtain the amount of emission related to the f-number. Preferably, emission amount values are stored in advance such that the brightness (luminance) per unit light receiving area of the image obtained with the imaging device 114 is constant even when the focal distance is changed.

(Control 7)

The above-described LED selection instruction according to the kind of pre-emission described with respect to control 4 is performed and the light emitting unit 200 is instructed to emit light to amount of emission according to the kind of pre-emission. The light emitting unit 200 is capable of simultaneously changing the LEDs in the light emitting state and the amount of emission.

There are various kinds of pre-emission. For example, amounts of emission are registered in advance in the EEPROM 160 with respect to kinds of pre-emission such as pre-emission performed for automatic focusing and pre-emission performed for red eye reduction. The amount of emission corresponding to one of the kinds of pre-emission is read out from the EEPROM 160 before the pre-emission is performed, and the light emitting unit 200 is instructed to emit light to the amount of emission read out.

A description will next be made of emission timing commands with respect to control 8.

(Control 81 )

When the light emitting unit 200 is made to emit light, a time to start light emission and a time to stop light emission are designated. In the case of pre-emission described above with respect to control 4 and control 7, there is no considerable problem with reducing the emission period for pre-emission relative to that for main emission in ordinary cases.

Therefore, the light emitting unit 200 is instructed to start light emission and stop light emission so that the emission period for pre-emission is shorter than that for main emission, thus achieving an energy saving effect.

At the time of main emission, the light emitting unit 200 is instructed to start light emission when accumulation of charge in the imaging device 114 is started, and to stop light emission when the charge accumulation is completed.

If there is a need to instruct the light emitting unit 200 to start light emission after the completion of charging of the light emitting unit 200, status information is obtained from the light emitting unit 200. Upon confirming the completion of charging from the status information, the light emitting unit 200 is instructed to start light emission.

Figure 7:
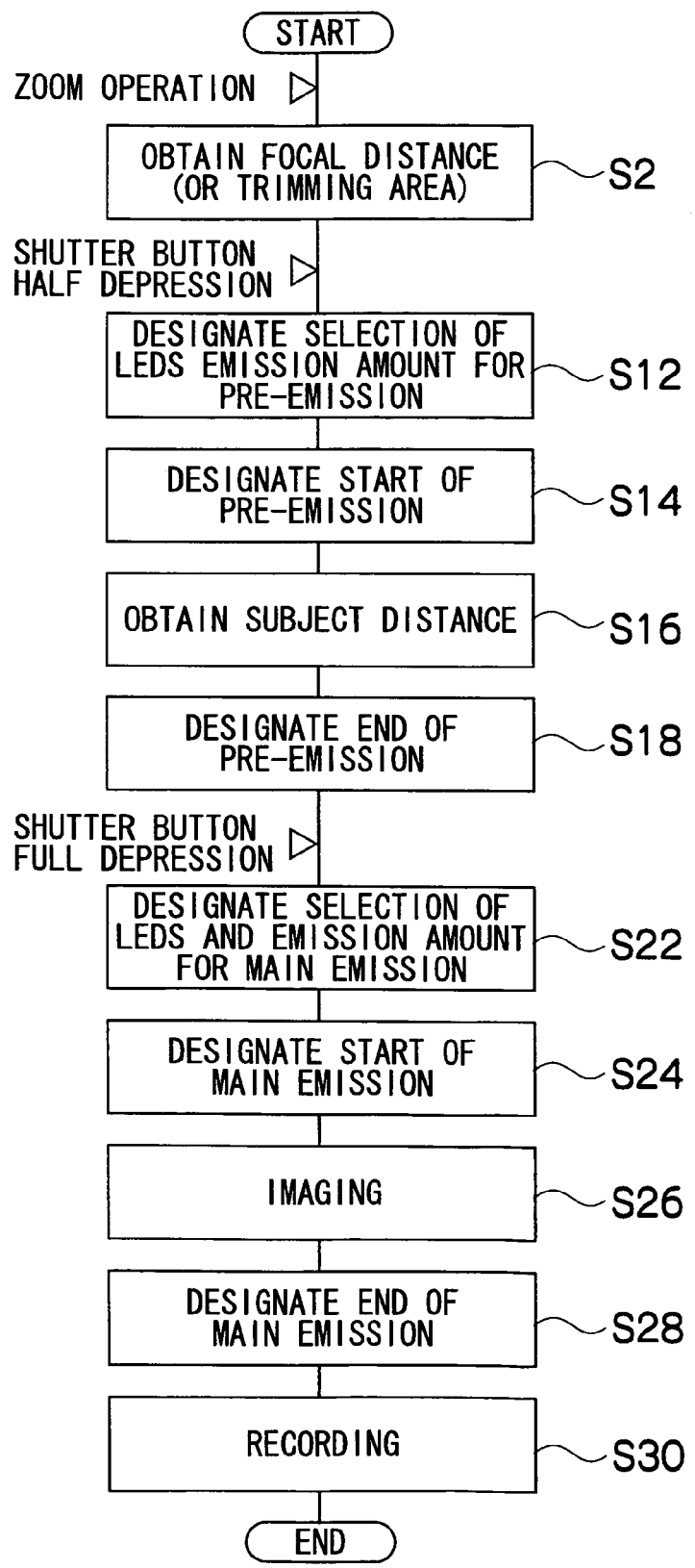
FIG. 7 is a flowchart schematically showing an example of the flow of processing at the time of imaging.

An example of the flow of imaging processing in the imaging apparatus in this embodiment will be outlined with reference to FIG. 7 with respect to imaging for obtaining a still image.

When the user performs a zoom operation on the operating unit 170, the CPU 140 obtains the focal distance (or trimming area) (step S2). That is, in the case of optical zoom, the focal distance according to the user operation is obtained. In the case of electronic zoom, the trimming area according to the user operation is obtained. If both optical zoom and electronic zoom are used, both the focal distance and the trimming area are obtained.

When the shutter button is half depressed, the CPU 140 supplies an LED selection command and an emission amount command for pre-emission to the light emitting unit 200 if it determines that there is a need for pre-emission for automatic focusing (step S12) and supplies an emission start command to the light emitting unit 200 (step S14). The light emitting unit 200 selects one or more of the LEDs according to the command and emits light to the emission amount according to the command. As the LEDs to be caused to emit light, the LEDs having the radiation area corresponding to the light receiving area of the distance metering sensor 102 are selected. Also, the emission amount for pre-emission is designated. After obtaining the subject distance from the distance metering sensor 102 (step S16) the CPU 140 supplies an emission stop command to the light emitting unit 200 (step S18). The emission stop command is such that the emission time is shorter than that for main emission. AE processing, AF processing and AWB processing are also performed under the control of the CPU 140.

When the shutter button is fully depressed, the CPU 140 supplies an LED selection command and an emission amount command for main emission to the light emitting unit 200 if it determines that there is a need for emission for subject imaging (step S22) and supplies an emission start command to the light emitting unit 200 (step S24). The light emitting unit 200 selects one or more of the LEDs according to the command and emits light to the emission amount according to the command. As the LEDs to be caused to emit light, a selection among the LEDs determined on the basis of the focal distance (or trimming area) and the subject distance is designated. Also, the emission amount determined on the basis of the subject distance (or f-number) is designated.

While the description has been made by assuming that main emission is performed without performing pre-emission for red eye reduction, pre-emission for red eye reduction is performed in practice before the start of main emission processing (step S22) if an operation for setting emission for red eye reduction has been performed. Main emission follows this pre-emission.

The subject image imaged with the imaging device 114 is temporarily stored in the memory 124 (step S26). An emission stop command is also supplied to the light emitting unit 200 (step S28). The subject image stored in the memory 124 undergoes predetermined signal processing and is thereafter recorded on a recording medium such as a memory card by the recording unit 156.

An example of an application of the light emitting unit and the imaging apparatus of the present invention to a digital camera has been described. However, the present invention is not limited to the digital camera. Needless to say, the present invention can also be applied to video cameras for taking a moving picture only and to portable telephones with cameras. The present invention can also be applied to silver-salt cameras.

What is claimed is:

1. A light emitting unit which radiates auxiliary light to a subject to be imaged, said light emitting unit comprising:

a plurality of light emitting elements disposed so as to have radiation areas different from each other, said light emitting elements being electrically connected in series; and a changing device which changes the number of light emitting elements in a light emitting state in said light emitting elements, wherein said changing device comprises a plurality of switching circuits provided in parallel with each other, one end of each of said plurality of switching circuits being connected to the light emitting elements at a predetermined position in the plurality of light emitting elements connected in series, and wherein, when a constant voltage is applied to one end of each of said plurality of switching circuits, said plurality of switching circuits substantially maintain the amount of current flowing through said light emitting elements regardless of the number of the light emitting elements in the light emitting state, wherein said plurality of switching circuits respectively have voltage dividing resistors for substantially maintaining the amount of current flowing through said light emitting elements regardless of the number of the light emitting elements in the light emitting state, the voltage dividing resistors differing in resistance value from each other.

2. The light emitting unit according to claim 1, wherein each of said light emitting elements comprises a light emitting diode.

3. An imaging apparatus comprising:

the light emitting unit according to claim 1;

a designation device which designates in the changing device of the light emitting unit the number of the light emitting elements in the light emitting state; and an imaging device which images the subject irradiated with auxiliary light from said light emitting elements.

4. A light emitting unit which radiates auxiliary light to a subject to be imaged, said light emitting unit comprising:

a plurality of light emitting elements disposed so as to have radiation areas different from each other, said light emitting elements being electrically connected in series; and a changing device which changes the number of light emitting elements in a light emitting state in said light emitting elements, wherein said changing device comprises a plurality of switching circuits provided in parallel with each other, one end of each of said plurality of switching circuits being connected to the light emitting elements at a predetermined position in the plurality of light emitting elements connected in series, and wherein, when a constant voltage is applied to one end of each of said plurality of switching circuits, said plurality of switching circuits substantially maintain the amount of current flowing through said light emitting elements regardless of the number of the light emitting elements in the light emitting state, wherein when each of a plurality of constant voltages differing in voltage value from each other are respectively applied to each of said plurality of switching circuits, said plurality of switching circuits substantially maintain the amount of current flowing through said light emitting elements regardless of the number of the light emitting elements in the light emitting state.

5. The light emitting unit according to claim 4, wherein each of said light emitting elements comprises a light emitting diode.

6. An imaging apparatus comprising:

the light emitting unit according to claim 4;

a designation device which designates in the changing device of the light emitting unit the number of the light emitting elements in the light emitting state; and an imaging device which images the subject irradiated with auxiliary light from said light emitting elements.

* * * * *